(12) United States Patent
Schoen

(10) Patent No.: US 10,342,073 B2
(45) Date of Patent: Jul. 2, 2019

(54) CONNECTION ARRANGEMENT FOR AN ELECTRICALLY CONDUCTIVE CONTACT AND A METHOD FOR PRODUCING SUCH A CONNECTION ARRANGEMENT

(71) Applicant: Richard Fritz Holding GmbH, Besigheim (DE)

(72) Inventor: Michael Schoen, Besigheim (DE)

( * ) Notice: Subject to any disclaimer, the term of this patent is extended or adjusted under 35 U.S.C. 154(b) by 5 days.

(21) Appl. No.: 15/643,838

(22) Filed: Jul. 7, 2017

(65) Prior Publication Data

US 2018/0014361 A1 Jan. 11, 2018

(30) Foreign Application Priority Data

Jul. 8, 2016 (DE) .................. 10 2016 112 566

(51) Int. Cl.
*H02G 3/00* (2006.01)
*H05B 3/84* (2006.01)
*B29D 23/00* (2006.01)
*B32B 17/10* (2006.01)

(52) U.S. Cl.
CPC .............. *H05B 3/84* (2013.01); *B29D 23/005* (2013.01); *B32B 17/10036* (2013.01); *B32B 17/1055* (2013.01); *B32B 17/10376* (2013.01); *B32B 17/10871* (2013.01); *B29K 2995/0005* (2013.01); *H05B 2203/003* (2013.01); *H05B 2203/011* (2013.01); *H05B 2203/014* (2013.01); *H05B 2203/016* (2013.01)

(58) Field of Classification Search
CPC .............. H05B 3/84; H05B 2203/003; H05B 2203/014; H05B 2203/016; H05B 2203/011; B29D 23/005; B29K 2995/0005; B32B 17/10036; B32B 17/10376; B32B 17/1055; B32B 17/10871; H01R 4/04; H01R 43/00
USPC .......... 174/98, 258, 256; 219/200, 203, 522, 219/521, 523
See application file for complete search history.

(56) References Cited

U.S. PATENT DOCUMENTS

| | | | | |
|---|---|---|---|---|
| 3,729,616 A | * | 4/1973 | Gruss ................ | B32B 17/10376 174/258 |
| 3,745,309 A | * | 7/1973 | Gruss ................ | B32B 17/10036 219/522 |
| 4,830,876 A | * | 5/1989 | Dietrich ............ | B32B 17/10036 427/108 |
| 5,099,104 A | * | 3/1992 | Holzer .............. | B32B 17/10036 219/203 |

(Continued)

*Primary Examiner* — Angel R Estrada
(74) *Attorney, Agent, or Firm* — Mark Wisnosky

(57) ABSTRACT

The invention relates to a connection arrangement for an electrically conductive contact between at least one electrical conductor (17) provided on a screen (16), in particular for a motor vehicle, and an electrical coupling element (18), wherein at least one contact point (20) between the coupling element (18) and the electrical conductor (17) is provided on a coupling point (15) for the at least one electrical conductor (17) and wherein the electrical coupling element (18) and the electrical conductor (17) are connected to each other by means of an electrically conductive compound (19), and wherein the at least one contact point (20) of the coupling point (15) is at least partially surrounded by a casting compound (24), and a method for producing such a connection arrangement (10).

16 Claims, 1 Drawing Sheet

(56) References Cited

U.S. PATENT DOCUMENTS

| | | | | |
|---|---|---|---|---|
| 7,200,921 B2* | 4/2007 | Loibl | ............... | B32B 17/10036 |
| | | | | 219/203 |
| 7,880,120 B2* | 2/2011 | Schmidt | ............ | B32B 17/10036 |
| | | | | 219/203 |
| 9,006,751 B2* | 4/2015 | Kleo | ................ | B32B 17/10036 |
| | | | | 257/82 |

* cited by examiner

CONNECTION ARRANGEMENT FOR AN ELECTRICALLY CONDUCTIVE CONTACT AND A METHOD FOR PRODUCING SUCH A CONNECTION ARRANGEMENT

CROSS-REFERENCE TO RELATED APPLICATIONS

This application claims priority to German Patent Application DE 10 2016 112 566.0, titled: A connection arrangement for an electrically conductive contact and a method for producing such a connection arrangement, Filed on 8 Jul. 2016.

STATEMENT REGARDING FEDERALLY SPONSORED RESEARCH OR DEVELOPMENT

Not Applicable.

BACKGROUND OF THE INVENTION

Technical Field

The invention relates to a connection arrangement for an electrically conductive contact and a method for producing such a connection arrangement.

Related Background Art

Connection arrangements for forming an electrically conductive contact between an electrical conductor and a coupling element are known, in which the coupling element is soldered to a soldering material on the electrical conductor. This electrical conductor can be formed, for example, as an antenna, an anti-theft device or a heating device in or on a screen for a motor vehicle. Soldering on a screen places specific material requirements on the solder used so that there is no resulting damage to the screen. To do so, soft solders containing lead have proved to be successful, by means of which cracks or tears in the screen or even glass breakages are avoided. However, because of EU guidelines, these lead-containing solders are not allowed to be used in this context as of 1 Jan. 2016 such that, in the future, only lead-free solder materials can be used. However, existing lead-free solders have the disadvantage that, in particular with laminated glass (VSG), glass breakages and, with toughened glass (ESG), ceramic breakages often take place.

Furthermore, electrically conductive adhesive connections for forming an electrically conductive contact between an electrical conductor and a coupling element are known. The electrically conductive adhesives used for this have a high proportion of conductive components, for example copper or silver, that, however, negatively influence the mechanical strength of these adhesives. Electrically conductive connections that withstand high stress are hardly possible, or not at all possible, with such adhesives.

The object of the invention is to propose a connection arrangement by means of which damage to a screen is avoided and a high strength of the connection arrangement is obtained. Furthermore, the object of the invention is to propose a method for producing such a connection arrangement.

BRIEF SUMMARY OF THE INVENTION

This object is solved by means of a connection arrangement for an electrically conductive contact between at least one electrical conductor provided on a screen, in particular for a motor vehicle, and an electrical coupling element in which at least one contact point between the coupling element and the electrical conductor is provided on a coupling point for the at least one electrical conductor and in which the electrical coupling element and the electrical conductor are connected to each other by means of an electrically conductive compound, and in which the at least one contact point of the coupling point is at least partially surrounded by a casting compound. By means of the casting compound that at least partially surrounds the contact point of the coupling point, a connection is created between the coupling element and the electrical conductor which withstands high mechanical stresses. Thus, this connection arrangement resists both strong peeling forces and high cyclical stresses and/or thermal influences such that the maintenance of the electrical contact is ensured.

An advantageous development of the connection arrangement provides that the at least one contact point is completely encased by the casting compound and the casting compound surrounding the at least one contact point touches the screen. As a result of the contact point being completely encased by the casting compound, a particularly strong and durable connection arrangement is formed. In addition, because the casting compound touches the screen, fixing the contact point on the screen is achieved. As a result, a highly resilient connection is formed both between the coupling element and the electrical conductor and between the coupling element and the screen. Here, the surface of the screen forms an adhesive surface for the casting compound.

It is preferably provided that the casting compound is formed from an adhesive, preferably from a curable adhesive. Here, the casting compound initially has a substantially fluid or viscous consistency such that at least the contact point can be overmoulded by the casting compound. As a result, it can be ensured that the contact point is completely encased or surrounded by the casting compound. By curing the adhesive, a high-strength connection between the coupling element, the electrical conductor and the screen is subsequently formed.

It is particularly preferably provided that the casting compound forms an additional adhesive connection between the at least one coupling element and the screen. By forming this additional adhesive connection, fixing the coupling element on the screen is achieved. The casting compound here has a corresponding degree of elasticity, such that damage to the screen as a result of the adhesive connection, in particular as a result of curing the adhesive connection, is avoided.

A further preferred embodiment of the connection arrangement provides that a primer or adhesion promoter is applied between the casting compound and a coating applied on the screen, in particular a ceramic coating. As a result, it is not necessary that the casting compound itself be formed to contain adhesive or as an adhesive compound. Rather, the adhesive connection between the screen and the casting compound applied thereon or a screen applied on the coating and the casting compound can take place by means of a layer made of a primer or an adhesion promoter.

In a further advantageous embodiment of the connection arrangement, it is provided that the casting compound is formed as a single-component or a two-component adhesive that preferably consists of polyurethane, silicone, acrylate, MS-polymer or epoxy resin. As a result of this embodiment of the casting compound, a high-strength adhesive is formed with which a highly resilient connection element can be produced. As a result, the electrical contact between the coupling element and the electrical conductor is ensured over a long period of time. In addition, the preferred materials offer particularly advantageous properties for processing the casting compound and, at the same time, form a particularly durable connection.

The electrically conductive compound is preferably formed as an electrically conductive adhesive compound. Because of this electrically conductive adhesive compound, an additional adhesive connection between the coupling element and the electrical conductor is formed. As a result, it is ensured that the coupling element is applied and fixed on the electrical conductor.

The electrical conductor is advantageously formed as an antenna, a screen heating device or an anti-theft device. Screen heating devices have been integrated into front and/or rear screens of motor vehicles for a long time. In modern motor vehicles, antennas for the car radio and the anti-theft devices are also provided in the screen. As a result, a multitude of connection arrangements are required which produce the contact between the electrical conductor in the screen and a current supply or a different electrical device.

The electrical conductor can be provided in the screen and at least one contact point of the electrical conductor is integrated on the outside of the screen. The electrical conductor can also be provided on the screen, in particular pressed on or vapour deposited. As a result of such an embodiment, the electrical conductor can be applied to the screen in a cost-effective manner.

In a further embodiment of the connection arrangement, it is provided that the screen is formed as single-pane toughened glass (ESG) or as laminated glass (VSG). In particular, screens of a motor vehicle are often formed as single-pane toughened glass or as laminated glass, as well. These screens offer particular safety advantages in the event of damage, for example in the event of an accident, or offer particular resistance to break-ins.

Furthermore, the object underlying the invention is solved by a method for producing a connection arrangement between at least one electrical conductor provided on a screen, in particular for motor vehicles, and an electrical coupling element, in particular according to one of the embodiments described above, wherein the at least one coupling element on at least one contact point of a coupling point and the electrical conductor are connected to an electrically conductive compound and, subsequently, the at least one contact point formed is encased by a casting compound. As a result of this method, a connection between the coupling element and the electrical conductor is formed that is particularly resistant to external influences. In addition, by using the casting compound, damage to the screen is prevented. Thus, by means of this method, a connection arrangement is formed that withstands both strong peeling forces and high cyclic stresses, as well as being able to be formed to be gentle towards the screen and able to be manufactured in a cost-effective manner.

The invention and further advantageous embodiments and developments of the same are described and explained in more detail in the following by means of the examples depicted in the drawings. The features that can be seen in the description and the drawings can be applied individually or together in any desired combinations according to the invention.

BRIEF DESCRIPTION OF THE DRAWINGS

They show.

DETAILED DESCRIPTION OF THE INVENTION

Figure 1:
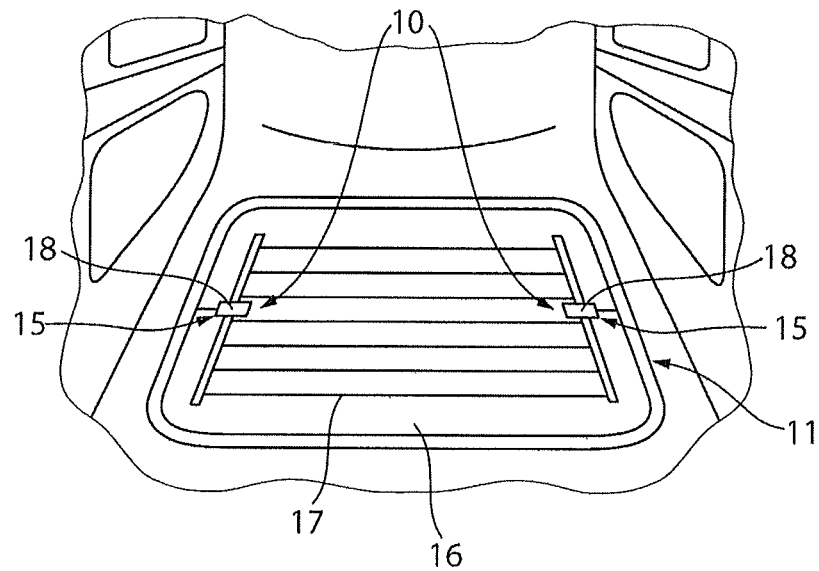
FIG. 1 a perspective view of a rear screen of a motor vehicle having a screen heating device,
FIG. 2 a sectional view of an electrically conductive connection arrangement and
FIG. 3 a schematic sectional view of an alternative embodiment of the electrically conductive connection arrangement relative to FIG. 2.

FIG. 1 shows a perspective view of a screen unit 11 of a motor vehicle. By way of example, this screen unit 11 is formed as a rear screen of the motor vehicle. This screen unit 11 can also be formed as a front screen, a side screen or as a screen for sealing a roof opening of the motor vehicle. The screen unit 11 is provided, in particular, as a fixed screen unit. At the same time, this can also be able to be opened. The screen unit 11 comprises a screen 16. This screen 16 is preferably formed from single-pane toughened glass (ESG) or from laminated glass (VSG). In addition, a ceramic coating 21 and/or a primer or adhesion promoter 26 can be applied on the screen 16.

The screen 16 has an electrical conductor 17. This electrical conductor 17 can form, for example, a screen heating device for heating the screen 16. At the same time, the electrical conductor 17 can be provided as an anti-theft device or an antenna for a car radio, car television, GPS or similar. The electrical conductor 17 can be formed, for example, from a silver alloy. This can be pressed onto the screen 16 by means of a special pressure method.

A connection arrangement 10 is provided on a coupling point 15 of the screen unit 11. This forms an electrical contact between the electrical conductor 17 directly or indirectly connected to the screen 16 and a coupling element 18 which is connected to a current supply and/or control device not depicted in more detail.

Figure 2:
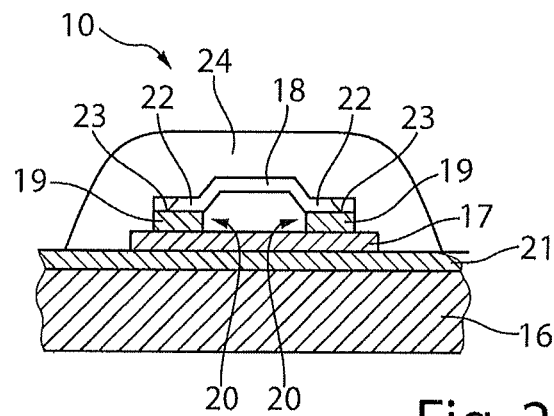

FIG. 2 shows a sectional view of the connection arrangement 10. In this connection arrangement 10, two contact points 20, for example, are formed between a coupling element 18 and the electrical conductor 17. This contact point 20 produces an electrically conductive contact between the coupling element 18 and the electrical conductor 17. An electrically conductive compound 19 is provided between the coupling element 18 and the electrical conductor 17. This compound 19 can be formed from an adhesive which includes electrically conductive components, for example copper or silver, such that the electrical conductivity of the compound 19 is obtained. As a result of this compound 19 formed as an adhesive, the coupling element 18 is fixed on the electrical conductor 17.

The coupling element 18 is formed as a contact bridge. This contact bridge has two contact arms 22 which are allocated to the electrical conductor 17. The two contact arms 22 each comprise a contact surface 23. The electrically conductive compound 19 is provided on the two contact surfaces 23, by means of which compound 19 the electrical contact with the electrical conductor 17 is formed. The coupling element 18 can also be formed in any other manner in order to form the electrical contact with the electrical conductor 17.

The at least one electrical conductor 17 can be provided directly on the screen 16 or on a ceramic coating 21 applied on the screen 16.

The coupling point 15, which comprises, for example, two contact points 20, is surrounded by a casting compound 24, in particular completely surrounded. This casting compound 24 has a fluid or viscous consistency such that the contact point 20 can be overmoulded by the casting compound 24. To form the connection arrangement 10, the coupling element 18 and the electrical conductor 17 are overmoulded by the casting compound 24. In particular, the casting compound 24 completely encloses the coupling element 18 and the electrical conductor 17 and seals these off outwardly to the surroundings. As a result, an additional connection between the coupling element 18 and the electrical conductor 17 is formed. As a result of overmoulding the coupling element 18 and the electrical conductor 17, the casting compound 24 also comes into contact with the surface of the screen 16. As a result, the casting compound 24 forms a further durable and resistant connection between the coupling element 18, the electrical conductor 17 and the screen 16.

The casting compound 24 consists, in particular, of a reactive adhesive or resin. This adhesive can be formed as a single-component or as a two-component adhesive. In particular, the casting compound 24 consists of polyurethane, silicone, acrylate, an MS-polymer or of epoxy resin. As a result of such a casting compound 24, a particularly durable connection between the coupling element 18, the electrical conductor 17 and the screen 16 is formed after the curing.

If the casting compound 24 can only form a weak adhesive connection to the coating 21 applied on the screen 16, regions adjacent to the electrical conductor 17 can be surrounded by an adhesive layer 26 or a primer such that, preferably, the casting compound 24 at least partially, preferably completely, surrounding the electrical conductor 17 is fixed by means of the adhesive layer 26 or the primer for coating 21 the screen 16.

Figure 3:
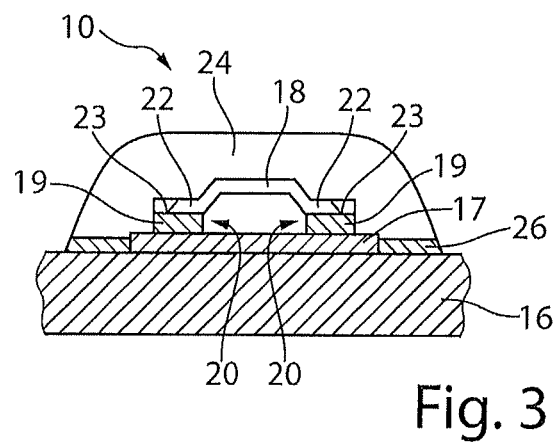

In FIG. 3, an alternative embodiment to FIG. 2 of a connection arrangement 10 for a coupling point 15 is depicted.

This embodiment differs from FIG. 2 in that the electrical conductor 17 is applied directly onto the screen 16, in particular pressed on or vapour deposited. The casting compound 24 surrounding, in particular encasing, the contact point 20 can be applied directly onto the screen 16 or as depicted for example, additionally fixed by means of an adhesion promoter 26 that is applied on the screen 16.

I claim:

1. Connection arrangement for an electrically conductive contact between at least one electrical conductor provided on a screen, and an electrical coupling element, wherein at least one contact point between the coupling element and the electrical conductor is provided on a coupling point for the at least one electrical conductor and wherein the electrical coupling element and the electrical conductor are connected to each other by means of an electrically conductive compound, and wherein the at least one contact point of the coupling point is at least partially surrounded by a casting compound.

2. Connection arrangement according to claim 1, wherein the at least one contact point is completely encased by the casting compound and the casting compound surrounding the at least one contact point touches the screen.

3. Connection arrangement according to claim 1, wherein the casting compound is formed from an adhesive or resin and forms an additional adhesive connection between the at least one coupling element and the screen.

4. Connection arrangement according to claim 1, wherein the casting compound is applied directly onto the screen.

5. Connection arrangement according to claim 1, wherein a primer or an adhesion promoter is applied between the casting compound and the screen or between the casting compound and a coating applied on the screen.

6. Connection arrangement according to claim 5, wherein the coating is a ceramic coating.

7. Connection arrangement according to claim 1, wherein the casting compound is formed as a single-component or a two-component adhesive or resin.

8. Connection arrangement according to claim 7, wherein the resin consists of polyurethane, silicone, acrylate, MS-polymer or epoxy resin.

9. Connection arrangement according to claim 1, wherein the electrically conductive compound is formed as an electrically conductive adhesive compound.

10. Connection arrangement according to claim 1, wherein the electrical conductor is formed as an antenna, a screen heating device or an anti-theft device.

11. Connection arrangement according to claim 1, wherein the electrical conductor is provided in the screen and the at least one contact point is integrated on an outside of the screen.

12. Connection arrangement according to claim 1, wherein the electrical conductor is provided on the screen.

13. Connection arrangement according to claim 12, wherein the electrical conductor is provided on the screen and is pressed on or vapour deposited.

14. Connection arrangement according to claim 1, wherein the screen is formed as single-pane toughened glass (ESG) or as laminated glass (VSG).

15. Connection arrangement according to claim 1, wherein the at least an electrical conductor is provided on a screen for a motor vehicle.

16. Method for producing a connection arrangement between at least one electrical conductor provided on a screen, and an electrical coupling element, wherein the at least one coupling element on at least one contact point of a coupling point and the electrical conductor are connected to an electrically conductive compound and, subsequently, the at least one contact point formed is encased by the casting compound.

* * * * *